US012500787B2

(12) United States Patent
Belling et al.

(10) Patent No.: US 12,500,787 B2
(45) Date of Patent: Dec. 16, 2025

(54) APPARATUS, METHOD, AND COMPUTER PROGRAM FOR MULTICAST SESSIONS IN LOCATION AREAS IN 5G NETWORKS

(71) Applicant: Nokia Technologies Oy, Espoo (FI)

(72) Inventors: Thomas Belling, Munich (DE); David Navrátil, Espoo (FI)

(73) Assignee: Nokia Technologies Oy, Espoo (FI)

( * ) Notice: Subject to any disclaimer, the term of this patent is extended or adjusted under 35 U.S.C. 154(b) by 437 days.

(21) Appl. No.: 17/999,173

(22) PCT Filed: May 22, 2020

(86) PCT No.: PCT/EP2020/064337
§ 371 (c)(1),
(2) Date: Nov. 17, 2022

(87) PCT Pub. No.: WO2021/233556
PCT Pub. Date: Nov. 25, 2021

(65) Prior Publication Data
US 2023/0224182 A1    Jul. 13, 2023

(51) Int. Cl.
*H04W 4/06* (2009.01)
*H04L 12/18* (2006.01)

(52) U.S. Cl.
CPC .......... *H04L 12/1845* (2013.01); *H04W 4/06* (2013.01)

(58) Field of Classification Search
CPC ........ H04W 4/06; H04W 4/18; H04W 4/185; H04W 4/20; H04W 8/24; H04W 8/205; H04W 28/00; H04L 12/1845

USPC ...................................................... 455/414.1
See application file for complete search history.

(56) References Cited

U.S. PATENT DOCUMENTS

| | | | |
|---|---|---|---|
| 2011/0188439 A1* | 8/2011 | Mao .................. | H04N 21/6405 370/312 |
| 2015/0282119 A1* | 10/2015 | Mcevilly ............... | H04W 24/10 370/312 |
| 2019/0158985 A1 | 5/2019 | Dao et al. | |
| 2020/0045753 A1 | 2/2020 | Dao et al. | |
| 2022/0408317 A1* | 12/2022 | Zhao ................. | H04W 36/0007 |

FOREIGN PATENT DOCUMENTS

| | | |
|---|---|---|
| WO | 2019/114939 A1 | 6/2019 |
| WO | 2021/138555 A1 | 7/2021 |
| WO | 2021/233555 A1 | 11/2021 |

OTHER PUBLICATIONS

"3rd Generation Partnership Project; Technical Specification Group Services and System Aspects; Study on architectural enhancements for 5G multicast-broadcast services (Release 17)", 3GPP TR 23.757, V0.3.0, Jan. 2020, pp. 1-37.

(Continued)

*Primary Examiner* — Jean A Gelin
(74) *Attorney, Agent, or Firm* — Nokia Technologies Oy

(57) ABSTRACT

There is provided an apparatus. The apparatus is configured to: store information of a multicast session, the information comprising at least one identifier of the multicast session, and information about access to different content for the multicast session in a plurality of different location areas; and, in response to a request from a second apparatus, provide to the second apparatus information about access to content of the multicast session in at least one of the plurality of different location areas.

18 Claims, 11 Drawing Sheets

(56) References Cited

OTHER PUBLICATIONS

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.
Invitation to Pay Addtional Search Fees received for corresponding Patent Cooperation Treaty Application No. PCT/ EP2020/064337, dated Feb. 18, 2021, 18 pages.
International Search Report and Written Opinion received for corresponding Patent Cooperation Treaty Application No. PCT/ EP2020/064337, dated Apr. 12, 2021, 26 pages.
"KI #6, new Solution Global Unicast Group ID for local Unicast Contents", SA WG2 Meeting #139E, S2-2004503, Agenda: 8.9, Nokia, Jun. 1-12, 2020, pp. 1-7.
"Completing description of location dependent services", 3GPP TSG-WG SA2 Meeting #144E e-meeting, S2-2103545, Agenda: 8.9, Nokia, Apr. 12-16, 2021, 3 pages.
"3rd Generation Partnership Project; Technical Specification Group Services and System Aspects; Architectural enhancements for 5G multicast-broadcast services; Stage 2 (Release 17)", 3GPP TS 23.247, V17.1.0, Dec. 2021, pp. 1-102.

* cited by examiner

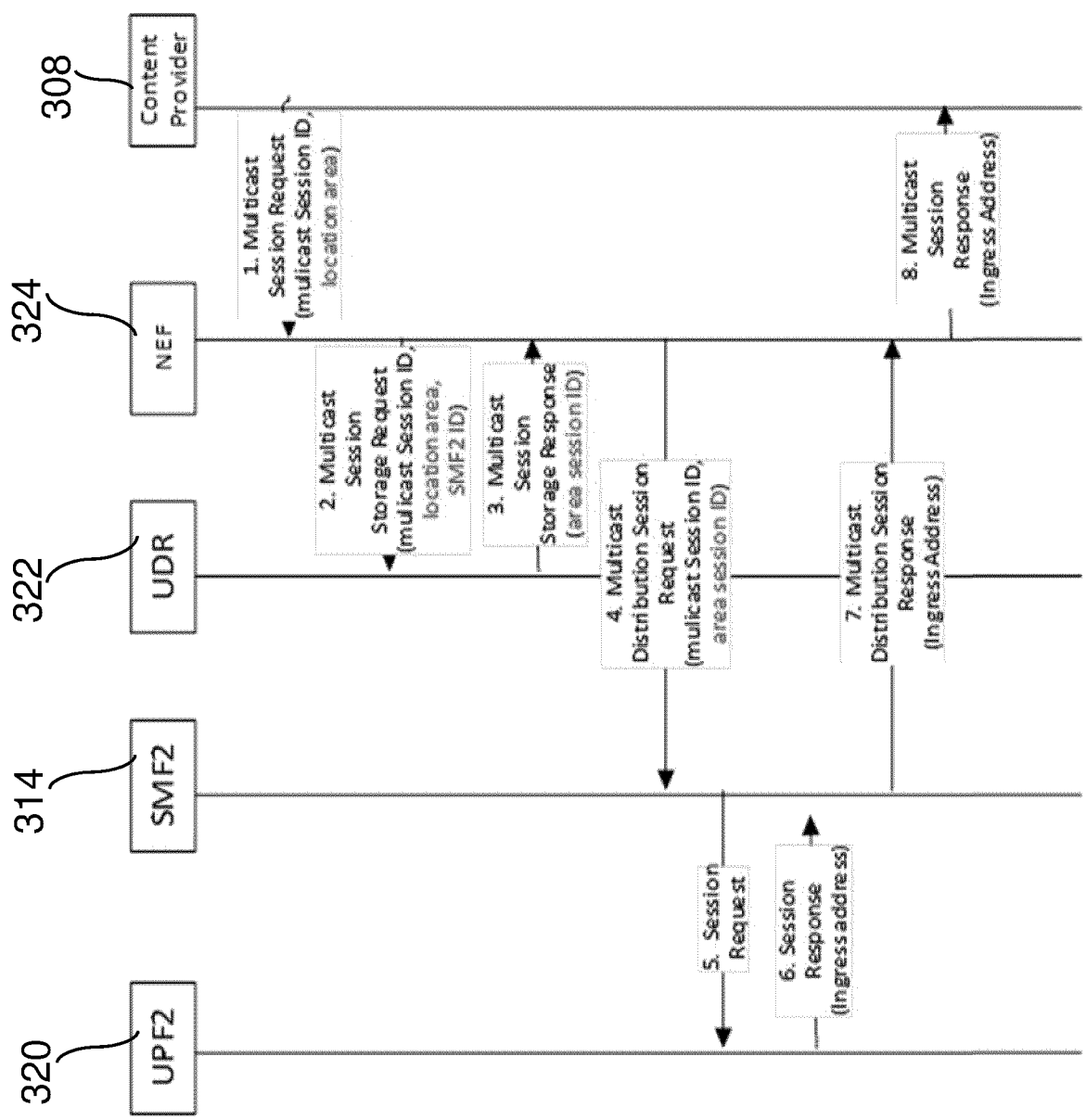

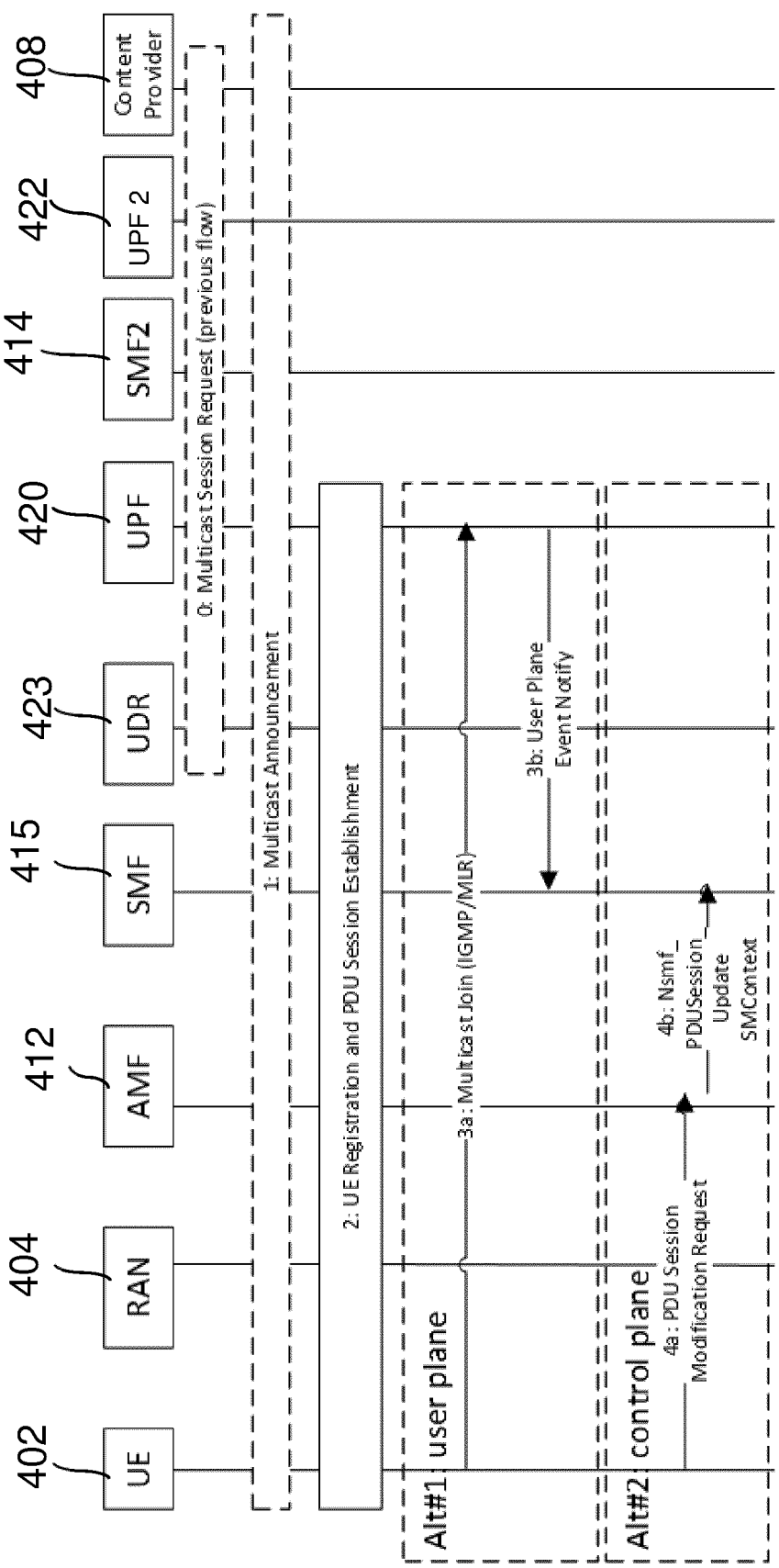
Fig. 4 (continued over)

S1 — Storing, at an apparatus, information of a multicast session, the information comprising at least one identifier of the multicast session, and information about access to different content for the multicast session in a plurality of different location areas S2 — In response to a request from a second apparatus, providing to the second apparatus information about access to content of the multicast session in at least one of the plurality of different location areas

Fig. 5

APPARATUS, METHOD, AND COMPUTER PROGRAM FOR MULTICAST SESSIONS IN LOCATION AREAS IN 5G NETWORKS

RELATED APPLICATION

This application was originally filed as PCT Application No. PCT/EP2020/064337, filed on May 22, 2020, which is incorporated herein by reference in its entirety.

FIELD

The present disclosure relates to apparatus, methods, and computer programs, and in particular but not exclusively to apparatus, methods and computer programs supporting and/or multicasting of data.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G radio or new radio (NR) access technology.

STATEMENT OF INVENTION

According to a first aspect there is provided an apparatus comprising: at least one processor; and at least one memory including computer program code; the at least one memory and the computer program code configured to, with the at least one processor, cause the apparatus at least to: store information of a multicast session, the information comprising at least one identifier of the multicast session, and information about access to different content for the multicast session in a plurality of different location areas; and, in response to a request from a second apparatus, provide to the second apparatus information about access to content of the multicast session in at least one of the plurality of different location areas.

According to some examples the information about access to different content for the multicast session in a plurality of different location areas comprises, for each location area, at least one of an identity of at least one control node for providing the multicast session in a respective location area a transport multicast address, and/or an area session identifier.

According to some examples the at least one control node comprises a core ingress control node.

According to some examples the information about the access to different content for the multicast session in a plurality of different location areas comprises, for each location area, an area session identifier.

According to some examples the plurality of different location areas comprise geographical location areas.

According to some examples the location areas are identified by one or more of: geographical coordinates, cell-ID.

According to some examples the at least one memory and the computer program code are configured to, with the at least one processor, cause the apparatus to: receive, from an entity, a request for the apparatus to store, for a multicast session, information about the access to different content for at least one location area of the plurality of different location areas.

According to some examples the entity comprises a network exposure function.

According to some examples the at least one memory and the computer program code are configured to, with the at least one processor, cause the apparatus to select an area session identifier for each stored location area of the multicast session.

According to some examples, the request from a second apparatus indicates a location, and wherein the at least one location area in the response to the request from the second apparatus is selected to comprise the location.

According to some examples the area session identifier comprises a unique area session identifier.

According to some examples the request from the entity comprises an area session identifier.

According to some examples the at least one memory and the computer program code are configured to, with the at least one processor, cause the apparatus to receive an area session identifier for a stored location area of a multicast session.

According to some examples the area session identifier comprises a unique area session identifier.

According to some examples the area session identifier is received from a network exposure function.

According to some examples the apparatus comprises a unified data repository.

According to some examples the second apparatus comprises a session management function.

According to some examples the second apparatus comprises a session management function serving a protocol data unit session of a communication device participating in the multicast session.

According to some examples the at least one control node comprises a multicast session ingress control node or a session management function.

According to some examples the multicast session ingress control node comprises a session management function.

According to a second aspect there is provided an apparatus comprising means for performing: storing information of a multicast session, the information comprising at least one identifier of the multicast session, and information about access to different content for the multicast session in a plurality of different location areas; and, in response to a request from a second apparatus, providing to the second apparatus information about access to content of the multicast session in at least one of the plurality of different location areas.

According to some examples the information about access to different content for the multicast session in a plurality of different location areas comprises, for each location area, at least one of an identity of at least one control node for providing the multicast session in a respective location area, a transport multicast address, and/or an area session identifier.

According to some examples the at least one control node comprises a core ingress control node.

According to some examples the information about the access to different content for the multicast session in a plurality of different location areas comprises, for each location area, an area session identifier.

According to some examples the plurality of different location areas comprise geographical location areas.

According to some examples the location areas are identified by one or more of: geographical coordinates, cell-ID.

According to some examples the means are further configured to receive, from an entity, a request for the apparatus to store, for a multicast session, information about the access to different content for at least one location area of the plurality of different location areas.

According to some examples the entity comprises a network exposure function.

According to some examples the means are further configured to cause the apparatus to select an area session identifier for each stored location area of the multicast session.

According to some examples the area session identifier comprises a unique area session identifier.

According to some examples the request from the entity comprises an area session identifier.

According to some examples, the request from a second apparatus indicates a location, and wherein the at least one location area in the response to the request from the second apparatus is selected to comprise the location.

According to some examples the area session identifier comprises a unique area session identifier.

According to some examples the area session identifier is received from a network exposure function.

According to some examples the apparatus comprises a unified data repository.

According to some examples the second apparatus comprises a session management function.

According to some examples the second apparatus comprises a session management function serving a protocol data unit session of a communication device participating in the multicast session.

According to some examples the at least one control node comprises a multicast session ingress control node or a session management function.

According to some examples the multicast session ingress control node comprises a session management function.

According to a third aspect there is provided a method comprising: storing, at an apparatus, information of a multicast session, the information comprising at least one identifier of the multicast session, and information about access to different content for the multicast session in a plurality of different location areas; and, in response to a request from a second apparatus, providing to the second apparatus information about access to content of the multicast session in at least one of the plurality of different location areas.

According to some examples, the information about access to different content for the multicast session in a plurality of different location areas comprises, for each location area, at least one of an identity of at least one control node for providing the multicast session in a respective location area, a transport multicast address, and/or an area session identifier.

Wherein the at least one control node comprises a core ingress control node.

Wherein the plurality of different location areas comprise geographical location areas.

Wherein the location areas are identified by one or more of: geographical coordinates, cell-ID.

According to some examples, the method further comprises receiving, from an entity, a request for the apparatus to store, for a multicast session, information about the access to different content for at least one location area of the plurality of different location areas.

According to some examples the entity comprises a network exposure function.

According to some examples the method further comprises selecting by the apparatus an area session identifier for each stored location area of the multicast session.

According to some examples, the area session identifier comprises a unique area session identifier.

According to some examples, the request from the entity comprises an area session identifier.

According to some examples, the request from a second apparatus indicates a location, and wherein the at least one location area in the response to the request from the second apparatus is selected to comprise the location.

According to some examples, the area session identifier comprises a unique area session identifier.

According to some examples, the area session identifier is received from a network exposure function.

According to some examples, the apparatus comprises a unified data repository.

According to some examples, the second apparatus comprises a session management function.

According to some examples, the second apparatus comprises a session management function serving a protocol data unit session of a communication device participating in the multicast session.

According to some examples, the at least one control node comprises a multicast session ingress control node or a session management function.

According to some examples, the multicast session ingress control node comprises a session management function.

According to a fourth aspect there is provided an apparatus comprising: at least one processor; and at least one memory including computer program code; the at least one memory and the computer program code configured to, with the at least one processor, cause the apparatus at least to: obtain a request from a communication device to join a multicast session; obtain location information of the communication device; and use the location information in order to obtain information about access to content for the multicast session in at least one location area corresponding to the obtained location information of the communication device.

According to some examples, the information about access to content for the multicast session in at least one location area comprises information of at least one location area, and for each location area at least one of the location area, a transport multicast address, an associated control node for providing the multicast session in that location area and/or an area session identifier.

According to some examples, the at least one memory and the computer program code are configured to, with the at least one processor, cause the apparatus to cause an enquiry to be sent for a location of the communication device when obtaining the location information.

According to some examples, the at least one memory and the computer program code are configured to, with the at least one processor, cause the apparatus to receive the information about the access to content for the multicast session in at least one location area in response to sending the location information of the communication device to a second apparatus, when obtaining the information about access to content for the multicast session in at least one location area.

According to some examples, the at least one memory and the computer program code are configured to, with the at least one processor, cause the apparatus to receive a plurality of information about access to content for the multicast session for a plurality of associated location areas, and selecting one of the plurality of information about the access to content for the multicast session in such a manner that the location of the communication device is within the location of the associated location area, when obtaining the information about access to content for the multicast session in at least one location area.

According to some examples, the at least one memory and the computer program code are configured to, with the at least one processor, cause the apparatus to send information that a communication device shall receive data related to a multicast session in a location area, and information about the access to content for the multicast session in at least one location area, to a third apparatus.

According to some examples, the at least one memory and the computer program code are configured to, with the at least one processor, cause the apparatus to: receive from the third apparatus updated location information, the updated location information comprising an indication that the communication device left the location area and/or an indication of a new location of the communication device; and obtain information about the access to content for the multicast session in at least one location area for providing the multicast session to the communication device in a location area incorporating the new location.

According to some examples, the at least one memory and the computer program code are configured to, with the at least one processor, cause the apparatus to: discover that the communication device left the multicast session; and send information to the third apparatus that the communication device left the multicast session.

According to some examples, the apparatus comprises a session management function serving a protocol data unit session of the communication device.

According to some examples, the at least one control node comprises a session management function.

According to some examples, the second apparatus comprises a unified data repository.

According to some examples, the third apparatus comprises an Access and Mobility Management Function or an access network node.

According to a fifth aspect there is provided an apparatus comprising means for performing: obtaining a request from a communication device to join a multicast session; obtaining location information of the communication device; and using the location information in order to obtain information about access to content for the multicast session in at least one location area corresponding to the obtained location information of the communication device.

According to some examples, the information about access to content for the multicast session in at least one location area comprises information of at least one location area, and for each location area at least one of the location area, a transport multicast address, an associated control node for providing the multicast session in that location area and/or an area session identifier.

According to some examples, the means are further configured to perform causing an enquiry to be sent for a location of the communication device when obtaining the location information.

According to some examples, the means are further configured to perform receiving the information about the access to content for the multicast session in at least one location area in response to sending the location information of the communication device to a second apparatus, when obtaining the information about access to content for the multicast session in at least one location area.

According to some examples, the means are further configured to perform receiving a plurality of information about access to content for the multicast session for a plurality of associated location areas, and selecting one of the plurality of information about the access to content for the multicast session in such a manner that the location of the communication device is within the location of the associated location area, when obtaining the information about access to content for the multicast session in at least one location area.

According to some examples, the means are further configured to perform sending information that a communication device shall receive data related to a multicast session in a location area, and information about the access to content for the multicast session in at least one location area, to a third apparatus.

According to some examples, the means are further configured to perform receiving from the third apparatus updated location information, the updated location information comprising an indication that the communication device left the location area and/or an indication of a new location of the communication device; and obtaining information about the access to content for the multicast session in at least one location area for providing the multicast session to the communication device in a location area incorporating the new location.

According to some examples, the means are further configured to perform discovering that the communication device left the multicast session; and sending information to the third apparatus that the communication device left the multicast session.

According to some examples, the apparatus comprises a session management function serving a protocol data unit session of the communication device.

According to some examples, the at least one control node comprises a session management function.

According to some examples, the second apparatus comprises a unified data repository.

According to some examples, the third apparatus comprises an Access and Mobility Management Function or an access network node.

According to a sixth aspect there is provided a method comprising: obtaining a request from a communication device to join a multicast session; obtaining location information of the communication device; and using the location information in order to obtain information about access to content for the multicast session in at least one location area corresponding to the obtained location information of the communication device.

According to some examples, the information about access to content for the multicast session in at least one location area comprises information of at least one location area, and for each location area at least one of the location area, a transport multicast address, an associated control node for providing the multicast session in that location area and/or an area session identifier.

According to some examples, the obtaining location information comprises causing an enquiry to be sent for a location of the communication device.

According to some examples, the obtaining information about access to content for the multicast session in at least one location area comprises receiving the information about the access to content for the multicast session in at least one location area in response to sending the location information of the communication device to a second apparatus.

According to some examples, the obtaining information about access to content for the multicast session in at least one location area comprises receiving a plurality of information about access to content for the multicast session for a plurality of associated location areas, and the method comprises selecting one of the plurality of information about the access to content for the multicast session in such a manner that the location of the communication device is within the location of the associated location area.

According to some examples the method further comprises sending information that a communication device shall receive data related to a multicast session in a location area, and information about the access to content for the multicast session in at least one location area, to a third apparatus.

According to some examples the method further comprises: receiving from the third apparatus updated location information, the updated location information comprising an indication that the communication device left the location area and/or an indication of a new location of the communication device; and obtaining information about the access to content for the multicast session in at least one location area for providing the multicast session to the communication device in a location area incorporating the new location.

According to some examples the method further comprises: discovering that the communication device left the multicast session; and sending information to the third apparatus that the communication device left the multicast session.

According to some examples the apparatus comprises a session management function serving a protocol data unit session of the communication device.

According to some examples the at least one control node comprises a session management function.

According to some examples the second apparatus comprises a unified data repository.

According to some examples the third apparatus comprises an Access and Mobility Management Function or an access network node.

According to a seventh aspect there is provided an apparatus comprising: at least one processor; and at least one memory including computer program code; the at least one memory and the computer program code configured to, with the at least one processor, cause the apparatus at least to: receive, from a first other apparatus, information that a communication device shall receive data related to a multicast session in a location area, and receive information about access to content for the multicast session in the location area; determine whether reception of content for the multicast session in the location area is already configured at the apparatus; and when it is determined that the reception of content for the multicast session is not yet configured at the apparatus, configure the reception of content for the multicast session in the location area at the apparatus.

According to some examples, the information about access to content for the multicast session in the location area comprises at least one of: information of a control node; a location area; an area session identifier, and/or a transport multicast address.

According to some examples, the at least one memory and the computer program code are configured to, with the at least one processor, cause the apparatus to, when the communication device has left the location area, send to the first other apparatus an indication that the communication device has left the location area and/or an indication of a new location of the communication device.

According to some examples, the at least one memory and the computer program code are configured to, with the at least one processor, cause the apparatus to: receive signalling from the first other apparatus indicating that the communication device left the multicast session; and in response, determine whether one or more other communication devices served by the apparatus participate in the multicast session in the location area; and when it is determined that no other communication devices served by the apparatus participate in the multicast session in the location area, configuring termination of the reception of content for the multicast session in the location area at the apparatus.

According to some examples, the at least one memory and the computer program code are configured to, with the at least one processor, cause the apparatus to: hand over the communication device to a second other apparatus; provide an indication to the second other apparatus that the communication device participates in the multicast session and information about access to content for the multicast session in the location area; determine whether one or more other communication devices served by the apparatus participate in the multicast session in the location area; and when it is determined that no other communication device served by the apparatus participate in the multicast session in the location area, configuring termination of the reception of content for the multicast session in the location area at the apparatus.

According to some examples, the at least one memory and the computer program code are configured to, with the at least one processor, cause the apparatus to: receive information of a hand over of a second communication device from a third other apparatus, including information that the second communication device participates in a multicast session, and information about access to content for the multicast session which the second communication device is participating in in a second location area; determine whether the second communication device has left the second location area; determine whether the reception of content for the multicast session which the second communication device is participating in is already configured at the apparatus; wherein when it is determined that the second communication device did not leave said second location area, and that the reception of content for the multicast session and the area session identifier or said second location area is not yet configured at the apparatus, configuring the reception of content for the multicast session in said second location area at the apparatus; and when it is determined that the second communication device has left said second location area, sending to the first other apparatus an indication that the second communication device has left said second location area and/or an indication of a new location of the second communication device.

According to some examples, the at least one memory and the computer program code are configured to, with the at least one processor, cause the apparatus to, when configuring the reception of content for the multicast session in the location area, send a request to the control node, and indicate the location area and/or the area session identifier in the request.

According to some examples, the at least one memory and the computer program code are configured to, with the at least one processor, cause the apparatus to, when configuring termination of the reception of content for the multicast session in the location area, send a request for the termination of the reception of content for the multicast session to the control node, the request for termination indicating at least one of the area session identifier or the location area.

According to some examples, the first other apparatus comprises a session management function or an Access and Mobility Management Function.

According to some examples, the apparatus comprises a radio access network node.

According to some examples, the second other apparatus comprises an access network node or radio access network node According to some examples, the third other apparatus comprises an access network node or radio access network node.

According to an eighth aspect there is provided an apparatus comprising means for performing: receiving, from a first other apparatus, information that a communication device shall receive data related to a multicast session in a location area, and receive information about access to content for the multicast session in the location area; determine whether reception of content for the multicast session in the location area is already configured at the apparatus; and when it is determined that the reception of content for the multicast session is not yet configured at the apparatus, configuring the reception of content for the multicast session in the location area at the apparatus.

According to some examples, the information about access to content for the multicast session in the location area comprises at least one of: information of a control node; a location area; an area session identifier, and/or a transport multicast address.

According to some examples, the means are further configured to perform, when the communication device has left the location area, sending to the first other apparatus an indication that the communication device has left the location area and/or an indication of a new location of the communication device.

According to some examples, the means are further configured to perform receiving signalling from the first other apparatus indicating that the communication device left the multicast session; and in response, determine whether one or more other communication devices served by the apparatus participate in the multicast session in the location area; and when it is determined that no other communication devices served by the apparatus participate in the multicast session in the location area, configuring termination of the reception of content for the multicast session in the location area at the apparatus.

According to some examples, the means are further configured to perform handing over the communication device to a second other apparatus; provide an indication to the second other apparatus that the communication device participates in the multicast session and information about access to content for the multicast session in the location area; determining whether one or more other communication devices served by the apparatus participate in the multicast session in the location area; and when it is determined that no other communication device served by the apparatus participate in the multicast session in the location area, configuring termination of the reception of content for the multicast session in the location area at the apparatus.

According to some examples, the means are further configured to perform: receiving information of a hand over of a second communication device from a third other apparatus, including information that the second communication device participates in a multicast session, and information about access to content for the multicast session which the second communication device is participating in in a second location area; determining whether the second communication device has left the second location area; determining whether the reception of content for the multicast session which the second communication device is participating in is already configured at the apparatus; wherein when it is determined that the second communication device did not leave said second location area, and that the reception of content for the multicast session and the area session identifier or said second location area is not yet configured at the apparatus, configuring the reception of content for the multicast session in said second location area at the apparatus; and when it is determined that the second communication device has left said second location area, sending to the first other apparatus an indication that the second communication device has left said second location area and/or an indication of a new location of the second communication device.

According to some examples, the means are further configured to perform configuring the reception of content for the multicast session in the location area, send a request to the control node, and indicate the location area and/or the area session identifier in the request.

According to some examples, the means are further configured to perform configuring termination of the reception of content for the multicast session in the location area, send a request for the termination of the reception of content for the multicast session to the control node, the request for termination indicating at least one of the area session identifier or the location area.

According to some examples, the first other apparatus comprises a session management function or an Access and Mobility Management Function, According to some examples, the apparatus comprises a radio access network node According to some examples, the second other apparatus comprises an access network node or radio access network node According to some examples, the third other apparatus comprises an access network node or radio access network node.

According to a ninth aspect there is provided a method comprising: receiving, from a first apparatus at a second apparatus, information that a communication device shall receive data related to a multicast session in a location area, and receiving information about access to content for the multicast session in the location area; determining whether reception of content for the multicast session in the location area is already configured at the second apparatus; and when it is determined that the reception of content for the multicast session is not yet configured at the second apparatus, configuring the reception of content for the multicast session in the location area at the second apparatus.

According to some examples, the information about access to content for the multicast session in the location area comprises at least one of: information of a control node; a location area; an area session identifier, and/or a transport multicast address.

According to some examples, the method further comprises, when the communication device has left the location area, sending to the first apparatus an indication that the communication device has left the location area and/or an indication of a new location of the communication device.

According to some examples, the method further comprises receiving signalling from the first apparatus indicating that the communication device left the multicast session; and in response, determining whether one or more other communication devices served by the second apparatus participate in the multicast session in the location area; and when it is determined that no other communication devices served by the second apparatus participate in the multicast session in the location area, configuring termination of the reception of content for the multicast session in the location area at the second apparatus According to some examples, the method further comprises handing over the communication device to a third apparatus; providing an indication to the third apparatus that the communication device participates in the multicast session and information about access to content for the multicast session in the location area; determining whether one or more other communication devices served by the second apparatus participate in the multicast session in the location area; and when it is determined that no other communication device served by the second apparatus participate in the multicast session in the location area, configuring termination of the reception of content for the multicast session in the location area at the second apparatus.

According to some examples, the method further comprises receiving information of a hand over of a second communication device from a fourth apparatus; including information that the second communication device participates in a multicast session, and information about t access to content for the multicast session which the second communication device is participating in in a second location area; determining whether the second communication device has left the second location area; determining whether the reception of content for the multicast session which the second communication device is participating in is already configured at the second apparatus. wherein when it is determined that the second communication device did not leave said second location area, and that the reception of content for the multicast session and the area session identifier or said second location area is not yet configured at the second apparatus, configuring the reception of content for the multicast session in said second location area at the second apparatus; and when it is determined that the second communication device has left said second location area, sending to the first apparatus an indication that the second communication device has left said second location area and/or an indication of a new location of the second communication device.

According to some examples, the configuring the reception of content for the multicast session in the location area comprises sending a request to the control node, and indicating the location area and/or the area session identifier in the request.

According to some examples, configuring termination of the reception of content for the multicast session in the location area comprises sending a request for the termination of the reception of content for the multicast session to the control node, the request for termination indicating at least one of the area session identifier or the location area.

According to some examples, the first apparatus comprises a session management function or an Access and Mobility Management Function, According to some examples, the second apparatus comprises a radio access network node According to some examples, the fourth apparatus comprises an access network node or radio access network node According to some examples, the fourth apparatus comprises an access network node or radio access network node.

According to a tenth aspect there is provided an apparatus comprising: at least one processor; and at least one memory including computer program code; the at least one memory and the computer program code configured to, with the at least one processor, cause the apparatus at least to: receive, from a first entity, information about a multicast session, the information comprising at least one identifier of the multicast session, and information about a location area where the content of the multicast session is to be distributed; select information about the access to content for the multicast session in the location area; and send to a second entity a request to store the information about the access to content for the multicast session in the location area.

According to some examples, the information about access to content for the multicast session in the location area comprises at least one of an identity of at least one control node for providing the multicast session in a respective location area, at least one of a transport multicast address, and/or an area session identifier.

According to some examples, the at least one memory and the computer program code are configured to, with the at least one processor, cause the apparatus to: determine an address where the first entity can send content for the multicast session at the location area; and send to the first entity, in response to the information from the first entity, the address where the first entity can send content for the multicast session at the location area.

According to some examples, the at least one memory and the computer program code are configured to, with the at least one processor, cause the apparatus to, when determining the address, request a control node to reserve resources to receive content for the multicast session at the location area and provide a related address where the first entity can send said content, and receive the address from a control node.

According to some examples, the at least one memory and the computer program code are configured to, with the at least one processor, cause the apparatus to provide to the control node an area session identifier.

According to some examples, the at least one memory and the computer program code are configured to, with the at least one processor, cause the apparatus to receive the area session identifier from a second entity.

According to some examples, the apparatus comprises a network exposure function.

According to some examples, the first entity comprises an application server or application function According to some examples, the second entity comprises a unified data repository.

According to some examples, the control node comprises a multicast session ingress control node or a session management function.

According to an eleventh aspect there is provided an apparatus comprising means for performing: receiving, from a first entity, information about a multicast session, the information comprising at least one identifier of the multicast session, and information about a location area where the content of the multicast session is to be distributed; selecting information about the access to content for the multicast session in the location area; and sending to a second entity a request to store the information about the access to content for the multicast session in the location area.

According to some examples, the information about access to content for the multicast session in the location area comprises at least one of an identity of at least one control node for providing the multicast session in a respective location area, at least one of a transport multicast address, and/or an area session identifier.

According to some examples, means are further configured to perform determining an address where the first entity can send content for the multicast session at the location area; and sending to the first entity, in response to the information from the first entity, the address where the first entity can send content for the multicast session at the location area.

According to some examples, the means are further configured to perform, when determining the address, requesting a control node to reserve resources to receive content for the multicast session at the location area and provide a related address where the first entity can send said content, and receiving the address from a control node.

According to some examples, the means are further configured to perform providing to the control node an area session identifier.

According to some examples, the means are further configured to perform receiving the area session identifier from a second entity.

According to some examples, the apparatus comprises a network exposure function.

According to some examples, the first entity comprises an application server or application function According to some examples, the second entity comprises a unified data repository.

According to some examples, the control node comprises a multicast session ingress control node or a session management function.

According to a twelfth aspect there is provided a method comprising: receiving at an apparatus, from a first entity, information about a multicast session, the information comprising at least one identifier of the multicast session, and information about a location area where the content of the multicast session is to be distributed; selecting information about the access to content for the multicast session in the location area; and sending to a second entity a request to store the information about the access to content for the multicast session in the location area.

According to some examples the information about access to content for the multicast session in the location area comprises an identity of at least one control node for providing the multicast session in a respective location area, at least one of a transport multicast address, and/or an area session identifier According to some examples the method further comprises: determining an address where the first entity can send content for the multicast session at the location area; and sending to the first entity, in response to the information from the first entity, the address where the first entity can send content for the multicast session at the location area.

According to some examples the determining the address comprises requesting a control node to reserve resources to receive content for the multicast session at the location area and provide a related address where the first entity can send said content, and receiving the address from a control node According to some examples the method further comprises providing to the control node an area session identifier.

According to some examples the method further comprises receiving the area session identifier from the second entity.

According to some examples the apparatus comprises a network exposure function.

According to some examples the first entity comprises an application server or application function According to some examples the second entity comprises a unified data repository.

According to some examples the control node comprises a multicast session ingress control node or a session management function.

According to a thirteenth aspect there is provided an apparatus comprising: at least one processor; and at least one memory including computer program code; the at least one memory and the computer program code configured to, with the at least one processor, cause the apparatus at least to: receive, from a first entity, a request to reserve resources to receive content for a multicast session at a location area; reserve resources to receive content for the multicast session at the location area: and determine a transport address to receive content for the multicast session at the location area.

According to some examples, the at least one memory and the computer program code are configured to, with the at least one processor, cause the apparatus to: receive a request to receive content for the multicast session at the location area at a second entity; and configure resources to forward received content for the multicast session at the location area to the second entity.

According to some examples, the at least one memory and the computer program code are configured to, with the at least one processor, cause the apparatus to: when reserving resources to receive content, request a third entity to reserve resources to receive content and reserve the transport address; determine a transport address by requesting the third entity to reserve the transport address and receive the transport address from the third entity.

According to some examples, the at least one memory and the computer program code are configured to, with the at least one processor, cause the apparatus to: when configuring resources to forward received content, request the third entity to forward received content at the transport address to the second entity.

According to some examples, the request from the first entity and the request from the second entity contain an area session identifier to identify the location area.

According to some examples, the apparatus comprises a multicast session ingress control node or a session management function According to some examples, the first entity comprises a network exposure function According to some examples, the second entity comprises an access network node According to some examples, the third entity comprises a user plane function.

According to a fourteenth aspect there is provided an apparatus comprising means for performing receiving, from a first entity, a request to reserve resources to receive content for a multicast session at a location area; reserving resources to receive content for the multicast session at the location area: and determining a transport address to receive content for the multicast session at the location area.

According to some examples, the means are further configured to perform receiving a request to receive content for the multicast session at the location area at a second entity; and configuring resources to forward received content for the multicast session at the location area to the second entity.

According to some examples, means are further configured to perform, when reserving resources to receive content, requesting a third entity to reserve resources to receive content and reserve the transport address; determining a transport address by requesting the third entity to reserve the transport address and receive the transport address from the third entity.

According to some examples, the means are further configured to perform, when configuring resources to forward received content, requesting the third entity to forward received content at the transport address to the second entity.

According to some examples, the request from the first entity and the request from the second entity contain an area session identifier to identify the location area.

According to some examples, the apparatus comprises a multicast session ingress control node or a session management function According to some examples, the first entity comprises a network exposure function According to some examples, the second entity comprises an access network node According to some examples, the third entity comprises a user plane function.

According to a fifteenth aspect there is provided a method comprising: receiving at an apparatus, from a first entity, a request to reserve resources to receive content for the multicast session at a location area; reserving resources to receive content for the multicast session at the location area: and determining a transport address to receive content for the multicast session at the location area.

According to some examples the method further comprises receiving a request to receive content for the multicast session at the location area at a second entity; and configuring resources to forward received content for the multicast session at the location area to the second entity.

According to some examples, the reserving resources to receive content comprises requesting a third entity to reserve resources to receive content and reserve the transport address; and determining a transport address comprises requesting the third entity to reserve the transport address and receiving the transport address from the third entity:

According to some examples, the configuring resources to forward received content comprises requesting the third entity to forward received content at the transport address to the second entity According to some examples, the request from the first entity and the request from the second entity contain an area session identifier to identify the location area.

According to some examples, the apparatus comprises a multicast session ingress control node or a session management function According to some examples, the first entity comprises an network exposure function According to some examples, the second entity comprises an access network node According to some examples, the third entity comprises a user plane function According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

BRIEF DESCRIPTION OF FIGURES

Embodiments will now be described, by way of example only, with reference to the accompanying Figures in which:

FIG. 3 is a signalling flow diagram according to an example;

FIG. 5 is a flow chart of a method according to an example;

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a 5G wireless communication system is briefly explained with reference to FIG. 1.

Figure 1:
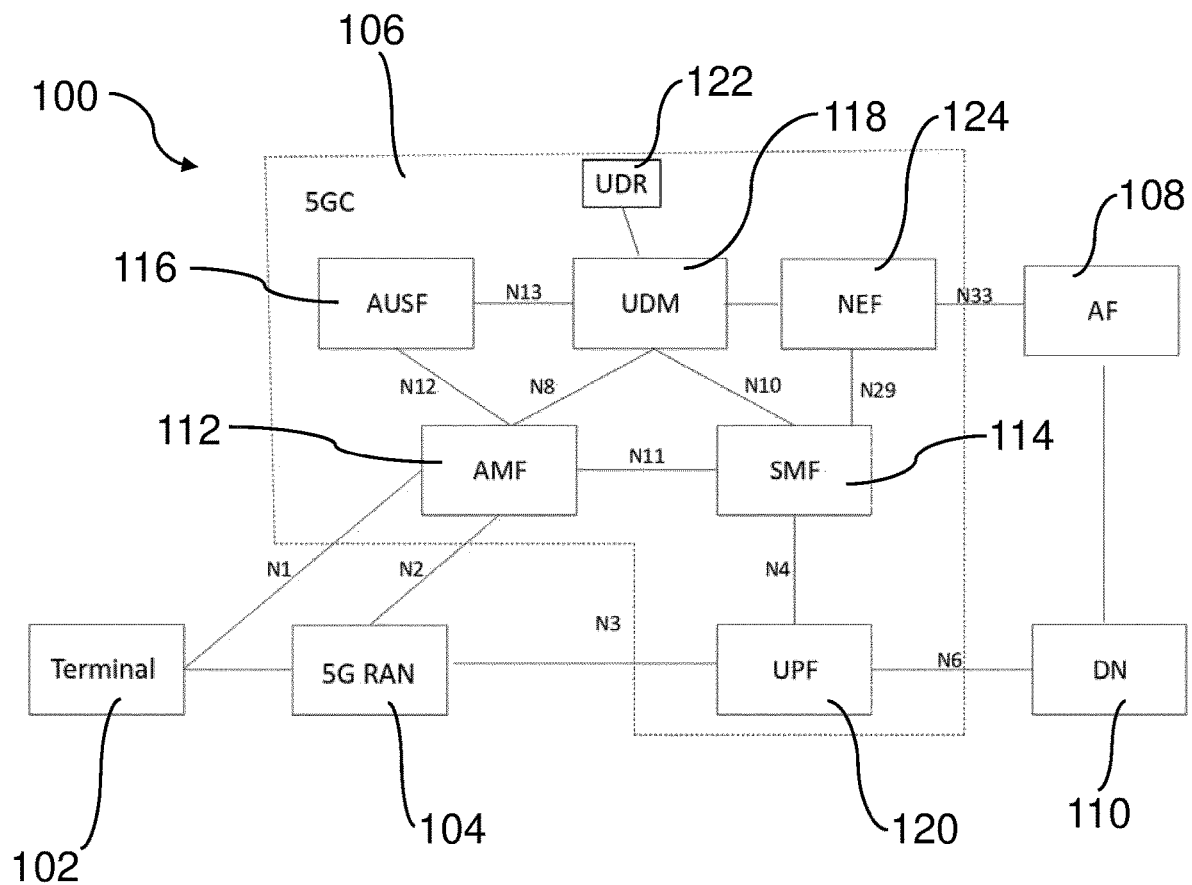
FIG. 1 shows a schematic representation of a 5G system.

FIG. 1 shows a schematic representation of a 5G system (5GS) 100. The 5GS may comprises a terminal 102 (which may also be referred to as a communication device or a UE), a 5G radio access network (5GRAN) 104, a 5G core network (5GCN) 106, one or more application functions (AF) 108 and one or more data networks (DN) 110.

The 5GRAN may comprise one or more gNodeB (GNB) distributed unit functions connected to one or more gNodeB (GNB) centralized unit functions. The RAN may comprise one or more access nodes.

The 5GCN 106 may comprise one or more access management functions (AMF), one or more session management functions (SMF), an authentication server function (AUSF) 116, a unified data management (UDM) 118, one or more user plane functions (UPF) 120, a unified data repository (UDR) 122 and/or a network exposure function (NEF) 124.

Figure 2:
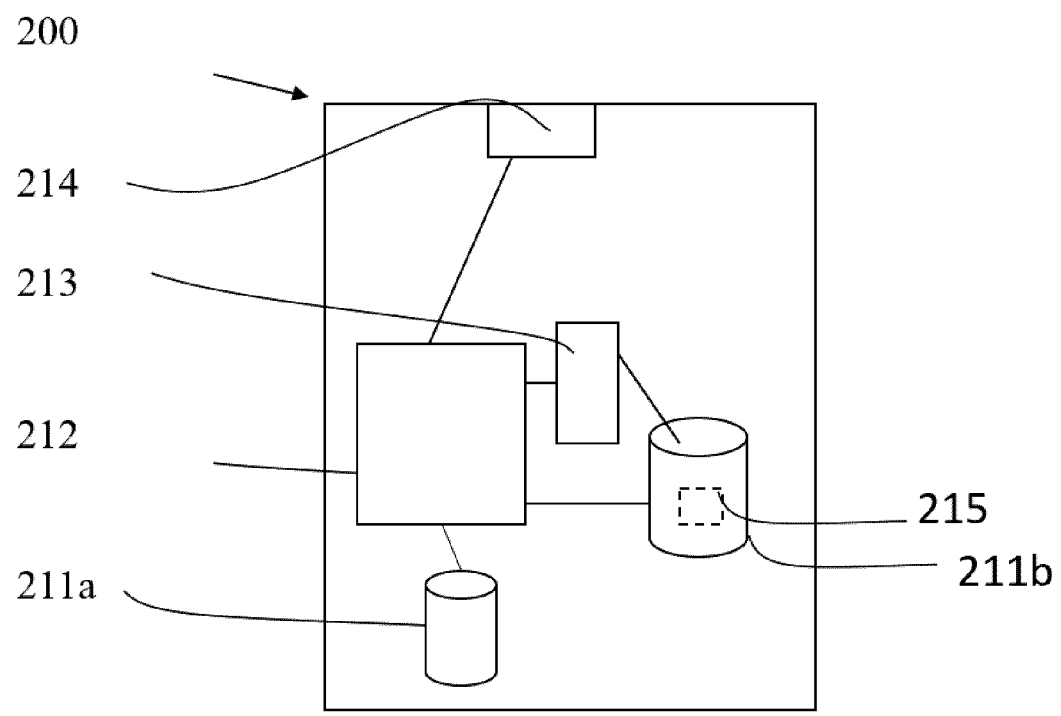
FIG. 2 shows a schematic representation of a control apparatus.

FIG. 2 illustrates an example of an apparatus 200. This apparatus may be provided in (and/or provide functionality of) an access node such as a RAN node, a UDR, an SMF, a NEF, an AMF, NMF or a UPF. The apparatus may comprise at least one random access memory (RAM) 211a, at least one read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b.

One or more aspects of this disclosure relate to a public land mobile network (PLMN), such as a 5GS PLMN. It will be understood that although one or more aspects of this disclosure relate to a 5GS they may be applicable to other cellular systems.

One or more aspects of this disclosure relate to 5G multicast-broadcast services (SGMBS).

For V2X (vehicle to everything), Public Safety and other services provided locally, there may be multicast or broadcast communication services only available in a local service area (e.g., per cell, TA (tracking area) or other geographic metric). Moreover, in some examples the service may only be available for a specific time (e.g., during event hours, emergency situation, or operation hours).

In such situations, it may be expected that different application servers (ASs), which may also be referred to as application functions (AFs), can be assigned to control the multicast or broadcast communication service(s) in each service area. Terminals or UEs may need to be configured to receive information about available multicast or broadcast service in the area where they are residing.

According to some examples, for a multicast group or a multicast session, different content may be provided to different UEs, for example depending on the location of UEs within the multicast group. After a UE joins a multicast session, the network selects the content to be provided to that UE for the multicast session, based on the UE's location.

According to some examples, a database in the network (e.g. UDR) stores information about access to content for the multicast session in one or several location areas. This information may comprise different ingress core control nodes (e.g. SMF, BM-SC (broadcast multicast service center)), which control the ingress point and user plane configuration for multicast group in different location areas. The ingress core control may also be referred to as a control node for providing a multicast session. The ingress point may be the entry point for the data to be multicast. When a UE joins a multicast session, the unicast core node (e.g. SMF) handling UE's unicast PDU (protocol data unit) session, on which the join request is received, enquires to the ingress node handling the multicast distribution for that multicast session and for the UE's location from the UDR. The unicast core node then triggers signaling, with the result that the ingress node handling the multicast content for the area of the UE's location sends that multicast content towards radio access network (RAN) nodes serving the UE's location, and the UE receives that content.

There now follows a description of three options for providing content to a UE in a multicast group. For ease of understanding these are described as three separate options below, though it will be understood that in examples aspects from the options may be combined. Reference is also made back to FIG. 1 to aid understanding.

Option 1

Within option 1, the following main aspects (and associated points) are considered: (i) selection of ingress node; (ii) procedure when a UE joins a multicast group; (iii) procedure when a UE leaves a location area; (iv) procedure when a UE leaves a multicast group; (v) procedure when a UE is handed over to a new RAN node. For ease of understanding these are discussed in turn below, but it will be understood that one or more of these procedures could occur in a different order or in parallel.

(i) Selection of Ingress Node

According to this example option, the UDR 122 stores information about access to content for the multicast session in one or several location areas. This information may comprise different ingress core nodes controlling the ingress points for different location areas. For example the ingress core nodes may comprise an SMF (such as SMF 114) or a BM-SC, and the ingress point may comprise a UPF (such as UPF 120). The UDR 122 also stores user plane configurations for a multicast session in different location areas, and an area session ID associated with each location area. By "multicast session in different location areas" is meant a group of UEs forming a multicast group, one or more of the UEs being in different geographical areas. In at least some examples the UDR may not be directly aware of the UEs, only of the location areas. In examples, the area session ID is used as an identifier in addition to the multicast session ID, to enable an ingress core node and/or RAN node to handle the distribution of different location-area dependent multicast content for the multicast group for several location areas. In examples where the location area is designated by a preconfigured identifier known within the entire network, the preconfigured identifier can be directly used in all signaling as area session ID.

In some examples, the UDR 122 is preconfigured with this information.

Alternatively to or in addition to the UDR 122 being preconfigured with this information, an AF (e.g. AF 108) may register that it provides content for a multicast session for a certain location area (e.g. list of cells, TAIs). For example, the AF 108 may register this information with NEF 124. In such an example, the NEF 124 selects an ingress control node (e.g. SMF) and stores a multicast session ID (e.g. IP multicast address), location area that the AF 108 provides content for, and ingress control node ID (e.g. SMF ID), in UDR 122. The NEF 124 is also configured to request area session IDs. The UDR 122 allocates the area session ID for the location area, and provides it to NEF 124. Alternatively, the NEF 124 selects an area session ID for the location area and requests the UDR 122 to store multicast session ID (e.g. IP multicast address), location area, area session ID, and ingress control node ID (e.g. SMF ID, SMF Set ID). NEF 124 then provides multicast session ID and area session ID to the ingress node (e.g. SMF 114). The ingress node (e.g. SMF 114) requests the ingress point (e.g. UPF 120) to reserve ingress address and ingress port of the ingress node, and provides the information of the address and the port to NEF 124. The ingress node (e.g. SMF 114) stores UPF's context related to multicast session ID, and area session ID. The NEF 124 provides the ingress address and port to the AF 108.

(ii) Procedure when a UE Joins a Multicast Group

When a UE (e.g. terminal 102) joins the multicast group, an SMF which serves UE's PDU session (and for ease of understanding may therefore be referred to as a serving SMF, and may be different from the SMF 114 selected by the NEF 124), checks with the UDR 122 for information about access to content for the multicast session in the location area where the UE is located. This information may comprise information of the multicast session ingress node (control node for providing the multicast session). If the UDR 122 indicates that different ingress core nodes have been allocated depending on UE location, the SMF enquires UE location from AMF 112/RAN, and requests from the UDR 122 information of the ingress core node for the given location and the multicast group/context. UDR 122 returns ingress node ID, area session ID, and location area to the serving SMF. Alternatively, the UDR 122 may return a list of ingress core nodes and associated location information, which the serving SMF then uses to select the ingress core node, area session ID and location area based on the UE's location.

The serving SMF then signals to the RAN that the UE 102 joins the multicast session/group, and indicates information about access to content for the multicast session in the location area where the UE is located, that may include ingress core node ID (e.g. ID of SMF 114 selected by the NEF (equivalent to SMF 314, 414 of FIGS. 3 and 4)), area session ID, and location area to the RAN.

In response, the RAN node (e.g. base station) checks if it already has a configured user plane to receive the multicast content for the given multicast session ID and area session ID. If the RAN determines that it does not have the configured user plane, then the RAN signals to the ingress core node (e.g. SMF 114) via an AMF (e.g. AMF 112), a request to receive multicast content for the multicast session ID and area session ID.

(iii) Procedure when a UE Leaves a Location Area

When the UE 102 leaves that location area, the RAN node provides a related event notification indicating the new UE location to the AMF 112 serving the related UE 102. The AMF 112 then forwards the event notification to the serving SMF. The RAN node checks if it (the RAN node) serves other UEs that joined the multicast group/context and area session ID. If there are no other UEs, the RAN node requests the ingress core node (e.g. SMF 114) via an AMF (e.g. AMF 112) to terminate transmission of multicast content to the RAN node and release user plane resources.

When the serving SMF receives a notification that the UE (e.g. UE 102) left the location area, the serving SMF sends a request to the UDR 122 for information of the new UE location, and information of the ingress core node for the multicast group/context in the new location. In response, the UDR 122 supplies the new ingress core node ID, new area session ID, and new location area. The serving SMF signals to the RAN node that the UE has changed the location area of the multicast group/context. The serving SMF indicates new ingress node ID, new location area, and new area session ID to the RAN node. The RAN node checks whether it already has a configured user plane to receive the multicast content for the multicast session ID and the new area session ID. When the RAN node determines that it does not have the necessary user plane, the RAN node contacts the new ingress core node via an AMF to request the new core node (e.g. SMF 114) to configure the user plane. Once the RAN node has the user plane, this allows the reception of multicast content for the multicast group and new area session ID by the RAN node.

(iv) Procedure when a UE Leaves a Multicast Group

When the UE (e.g. terminal 102) leaves the multicast group/session, the RAN node receives UE-specific signaling from the serving SMF indicating that the UE 102 left the multicast group. The RAN node checks if it serves other UEs that joined the multicast group/session identified by multicast session/context identity and receive contents for the same location area. If there are no other UEs, the RAN node requests the core node (e.g. SMF 114) to terminate transmission of multicast content for the location area to RAN node and release user plane resources.

(v) Procedure when a UE is Handed Over to a New RAN Node

When the UE (e.g. terminal 102) is handed over to another RAN node, the information about the multicast session the UE joined, and information about access to content for the multicast session in the location area where the UE is located that may include location area, area session ID, and the related ingress core node, is transferred from the old RAN node to the new RAN node. The old RAN node checks if it (the old RAN node) serves other UEs that joined the multicast group/context and receive contents for the same location area. If there are no other UEs, the (old) RAN node requests the core node (e.g. SMF 114) to terminate transmission of multicast content for the location area to the (old) RAN node and release user plane resources. The new RAN node checks if the new UE location is within the location area of the new RAN node. If the new UE location is not within the location area of the new RAN node, the new RAN node notifies the serving SMF. On the other hand, if the new UE location is within the location area, the new RAN node checks if it (the new RAN node) has user plane configured to receive multicast content for this multicast group (multicast context) and location area. The new RAN node also checks whether it (the new RAN node) already receives multicast content for this multicast group (multicast context) and location area. If the new RAN node doesn't receives multicast content for this multicast group (multicast context) and area session ID, the new RAN node contacts the core node (e.g. SMF 114) via an AMF (e.g. AMF 112) to request the core node to configure the user plane to allow the reception of multicast content for the multicast group and location area by the RAN node.

Option 2

Option 2 is based on option 1. However, in option 2, the network repository function (NRF) is used as the database rather than the UDR 122.

Therefore, in option 2, each ingress core node (e.g. SMF 114), may store in the NRF the profile information about multicast session(s) of the ingress core node, in combination with information of location area(s) and area session ID(s) that the ingress core node serves.

Option 3

According to option 3, the UDR 122 stores information of whether a multicast session has local content.

The RAN (e.g. 5G RAN 104) is informed when a UE joins a multicast session. The RAN 104 is also informed whether the multicast session has local content. In some examples, the RAN is informed via UE-specific signaling.

The RAN node 104 then selects a local core node (e.g. SMF) for local multicast distribution. In some examples, the local core node is selected based on local configuration of the multicast session.

It will thus be appreciated that in some examples of this option, the UDR stores only location areas and corresponding area session IDs. The SMF serving UE's PDU session retrieves the area session ID and sends it to the RAN via UE-specific signalling. A difference with Option 1 and Option 2 is that the information about a local core node (SMF) for local multicast distribution is configured to the RAN.

Reference is now made to the flow chart of FIG. 3 which explains an example embodiment in more detail. The flow chart of FIG. 3 relates to "Option 1" described above.

At S1, an AF of a content provider 308 has content for a multicast session. The AF registers that it has the content for a multicast session with NEF 324. The multicast session is identified by a multicast session identifier. In some examples, the multicast session identifier comprises an IP multicast address of the multicast session. The AF also registers a location area for the multicast session. Thus it will be understood that in some examples the application function registers a location area associated with a multicast session, when registering the multicast session (for example with the NEF). In some examples the location area is defined by one or more of: list of cells; tracking area identity (TAI); geographical area (e.g. GPS coordinates). It will be understood that in some examples multiple AFs may register for the same multicast session but in different location areas.

It will be understood that in examples a UE's location, and location area for multicast session, are not the same (or not necessarily the same). A location area for the multicast session is an area where location specific content, which may be different from the content provided in other location areas of the multicast session, is provided from an AF to the multicast session. A UE's location is used by the network (SMF or UDR) to find in what area location a UE joining multicast session is. For example, a UE's location could be UE's current serving TAI. The location area for multicast can be a list of TAIs. The network needs to find the list which contains UE's TAI In this example, NEF 324 selects SMF2 314 as the ingress control node. For example, the NEF 324 may make this selection based on location area, using the location area information obtained from AF 308. That is in examples the ingress control node is selected based on location area information for the multicast session.

At S2, the NEF 324 requests storage of the multicast session at the UDR 322. As part of this, the NEF 324 provides the multicast session ID, identifier of the selected ingress node (in this case SMF2 314), and the location area to the UDR 322. The UDR 322 then allocates an area session ID for the location area. The UDR 322 then stores the area session ID along with the multicast session ID, identifier of the selected ingress node (in this case SMF2 314), and the location area. Alternatively, the NEF 324 selects an area session ID for the location area, and requests the UDR 322 to store multicast session ID (e.g. IP multicast address), location area, area session ID, and ingress control node ID (e.g. SMF ID, SMF Set ID).

At S3, the UDR 322 provides the area session ID to the NEF (this step may not be required where the NEF 324 provided the area session ID to the UDR 322 already).

At S4, the NEF 324 requests the SMF2 to reserve ingress resources for the multicast session (e.g. for a multicast distribution session). The NEF 324 provides Multicast session ID and area session ID to the SMF2 314.

At S5 The SMF2 314 stores the multicast session ID and area session ID. Using this information, the SMF2 314 selects a suitable user plane function for providing a user plane for the multicast session. In this example the SMF2 314 selects the UPF2 320 and requests that UPF2 320 reserves user plane ingress resources.

At S6 the UPF2 320 selects an ingress address (IP address and port) and provides the ingress address to SMF2 314.

At S7, SMF2 314 indicates the ingress address to the NEF 324.

At S8, the NEF 324 indicates the ingress address to the AF of the content provider (AF 308).

Figure 4:
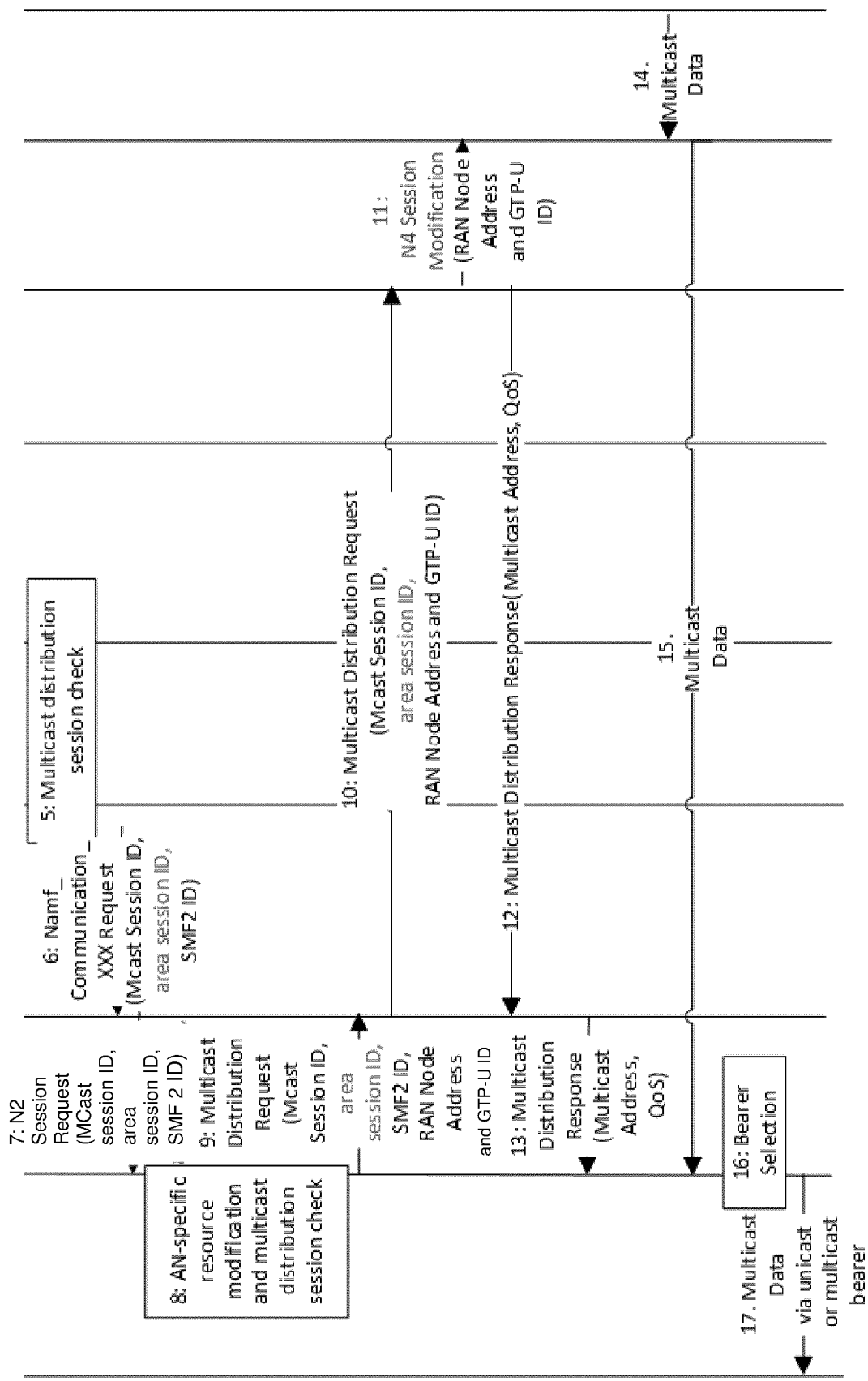
FIG. 4 is a signalling flow diagram according to an example.

Reference is now made to the signal flow chart of FIG. 4. In some examples, the process of FIG. 4 may follow on from FIG. 3. Again, this flow chart is directed to Option 1 described above. FIG. 4 shows communications between content provider 408 (or AF thereof), UPF2 422, SMF2 414, UPF 420, UDR 423, SMF 415, AMF 412, RAN 404, and UE 402. In some examples the SMF 415 may be considered the serving SMF, and the SMF2 414 may be considered the core ingress control node.

At S0, content provider 408 may register that it provides content for a multicast session for a certain location area as described in FIG. 3.

At S1, content provider 408 announces a multicast session to the UE 402. This announcement may provide multicast session information and/or group information. This may for example comprise a multicast group identified by a multicast IP address.

For example, UE 402 may receive a session description. This session description may be in a SDP (session description protocol) format. The session description may comprise media transport information for one or more of each media stream. The media transport information may comprise the IP multicast group address and/or the transport port for media.

At S2, the UE registers and establishes a PDU session towards a first SMF, SMF 415. SMF 415 assigns a first UPF, UPF1, to transmit data related to the PDU session.

As shown in S3a and S3b, or S4a and S4b, SMF 415 obtains or receives a request from UE 402 to join a multicast group indicated in the multicast session information in S1 (e.g. an IP multicast group address).

In S5, SMF 415 enquires at the UDR 423 if a multicast distribution session control node (i.e. ingress control node) for the multicast session is already selected. In this example UDR 423 indicates that local multicast sessions have been allocated. SMF 415 sends an enquiry to AMF 412 for the location of UE 402. The SMF 415 then provides the location of the UE 402 to the UDR 423. UDR 423 compares the provided UE location with registered location areas for the multicast session, in order to determine the ingress control node in that area. In this example UDR 423 indicates to SMF 415 that SMF2 414 is the ingress control node of the multicast distribution session at the location of UE 402. The UDR 423 then provides area session ID to SMF 415. Alternatively, the UDR 423 may return a list of ingress core nodes and associated location information in reply to the enquiry from the SMF 415. The SMF 415 then uses the list to select an ingress core node, area session ID and location area based on the UE's location.

In S6 and S7, the SMF 415 signals via the AMF 412 (S6) to the RAN 404 (S7) that UE 402 shall be added to the multicast group and/or context. This signalling may indicate the multicast group and/or context ID and/or session ID corresponding to the multicast group identity (e.g. the IP multicast group address). This signalling may alternatively or additionally comprise the SMF ID and/or SMF Set ID of the second SMF, SMF2 414 as reference to the 5GC entity controlling group distribution. Moreover, it is to be noted that the SMF 415 signals via the AMF 412 to the RAN 404 one or more of the location area of the UE 402 and the area session ID.

In S8, the RAN node 404 configures the resources to transmit the multicast session to the UE 402. The RAN node 404 may check whether the user plane to receive the multicast content of the multicast group/context, and area session ID, is already established at the RAN node 404.

In S9, if no user plane is established, the RAN node 404 may select based on SMF2 414 ID and/or SMF2 414 Set ID the AMF 412 to reach SMF2 414. The RAN node 404 may then signal a request for the user plane establishment towards that AMF 412 and indicates SMF2 414 ID and/or SMF2 414 Set ID and Multicast context/group ID and area session ID. If the RAN node 404 is configured to use a unicast transport for multicast distribution sessions, RAN node 404 allocates a downlink tunnel (an IP address and a GTP-U ID) for the reception of the multicast distribution session and indicates the downlink tunnel information in the request.

In S10 the AMF 412 signals a request for the multicast distribution session towards the SMF2 414 indicated in S9. SMF2 414 retrieves a stored context of multicast distribution session for the multicast session ID and area session ID. The SMF2 414 may determine a QoS for the multicast session.

In S11, for unicast transport of the multicast distribution session, SMF2 414 configures the second UPF, UPF2 422 to transmit the multicast distribution session towards the received IP address and a GTP-U ID (provided by the RAN 404). That is UPF2 422 is the ingress point.

In S12, SMF2 414 sends a multicast distribution session response via the association to the AMF 412. The response may indicate a QoS for the multicast session. For multicast transport of the multicast distribution session, the response may also indicate a transport multicast address.

At S13, the AMF 412 forwards a multicast distribution session response to the RAN node 404.

In S14, the content provider sends multicast data to UPF2 422.

In S15, UPF2 422 forwards the multicast data to the RAN node 404.

In S16, the RAN 404 performs a bearer selection to determine if the data is to be transported to the UE via a unicast or multicast bearer.

In S17, the multicast data is transported from the RAN 404 to the UE 402 via the selected unicast or multicast bearer.

It will be understood from the above that example embodiments may avoid changing multicast session IDs depending on UE location, for services with different content depending on UE location, e.g. for V2X. This may avoid complex UE configuration and session announcements.

FIG. 5 is a flow chart of a method according to an example.

At S1, the method comprises storing, at an apparatus, information of a multicast session, the information comprising at least one identifier of the multicast session, and information about access to different content for the multicast session in a plurality of different location areas.

At S2, the method comprises, in response to a request from a second apparatus, providing to the second apparatus information about access to content of the multicast session in at least one of the plurality of different location areas.

Figure 6:
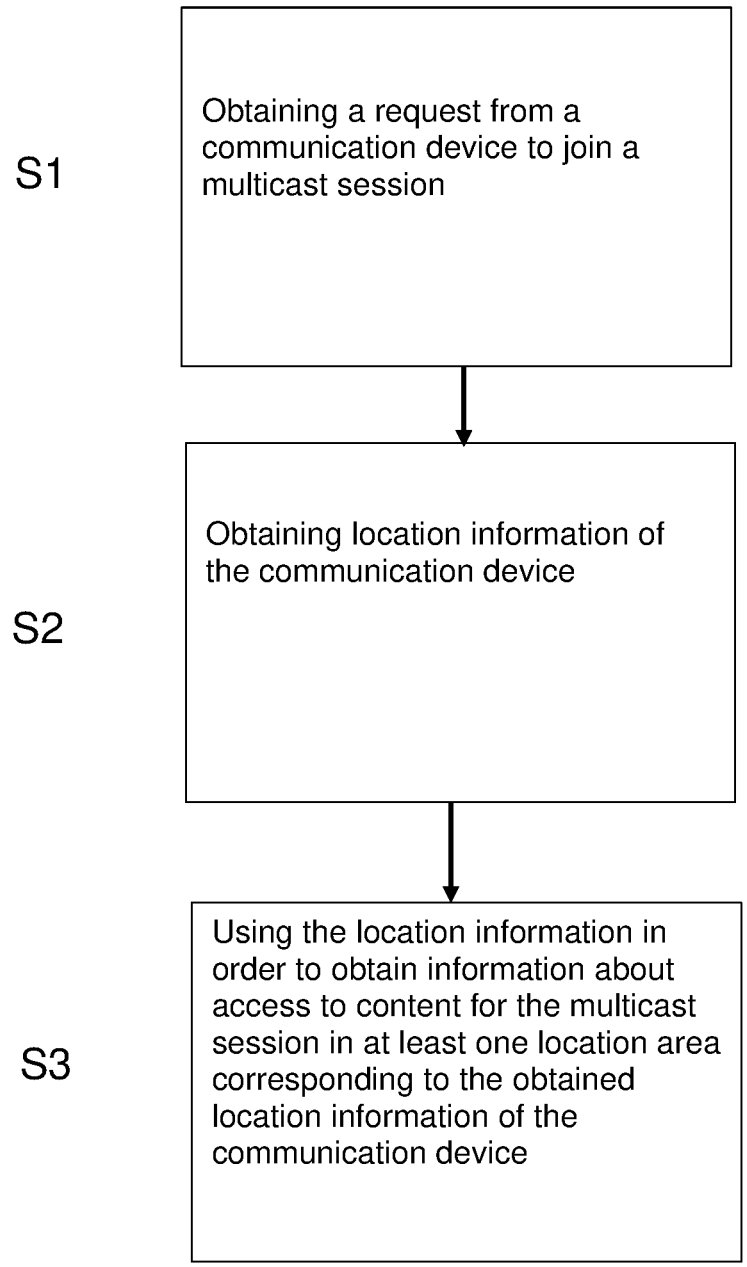
FIG. 6 is a flow chart of a method according to an example.

FIG. 6 is a flow chart of a method according to an example.

At S1, the method comprises obtaining a request from a communication device to join a multicast session.

At S2, the method comprises obtaining location information of the communication device.

At S3, the method comprises using the location information in order to obtain information about access to content for the multicast session in at least one location area corresponding to the obtained location information of the communication device.

Figure 7:
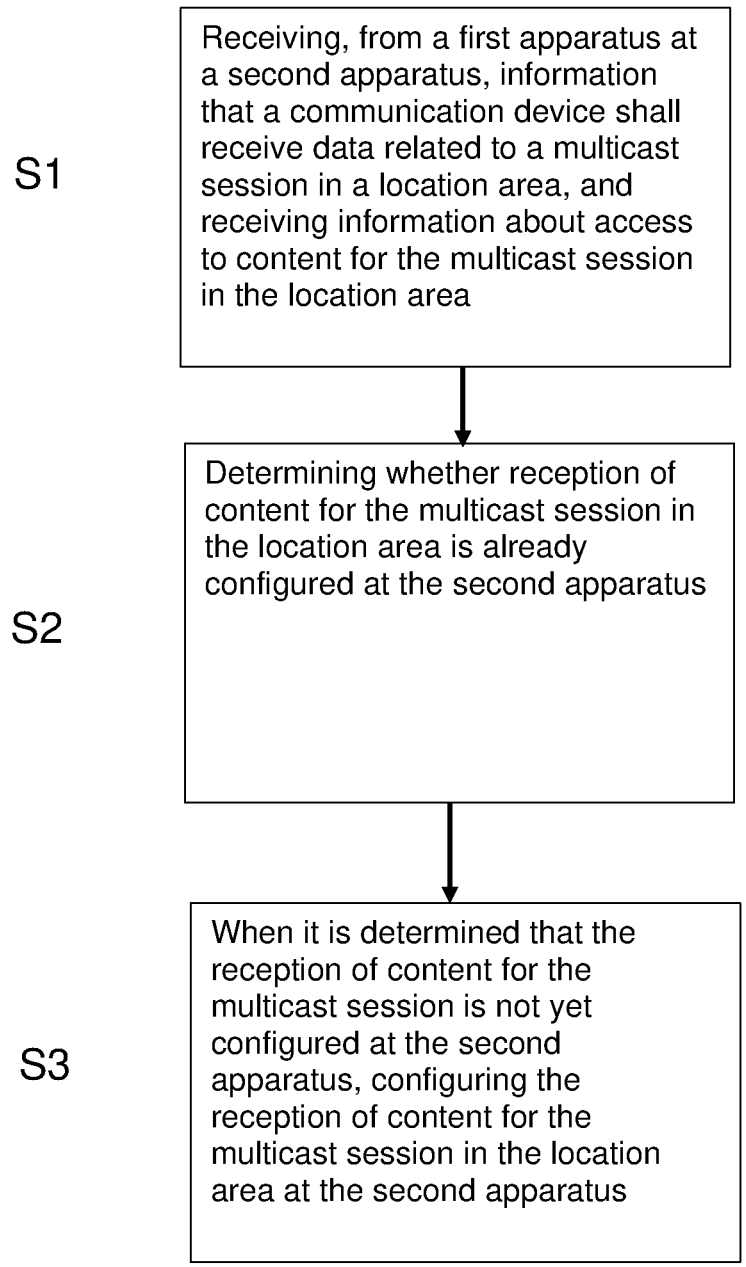
FIG. 7 is a flow chart of a method according to an example.

FIG. 7 is a flow chart of a method according to an example.

At S1, the method comprises receiving, from a first apparatus at a second apparatus, information that a communication device shall receive data related to a multicast session in a location area, and receiving information about access to content for the multicast session in the location area.

At S2 the method comprises determining whether reception of content for the multicast session in the location area is already configured at the second apparatus.

At S3 the method comprises, when it is determined that the reception of content for the multicast session is not yet configured at the second apparatus, configuring the reception of content for the multicast session in the location area at the second apparatus.

Figure 8:
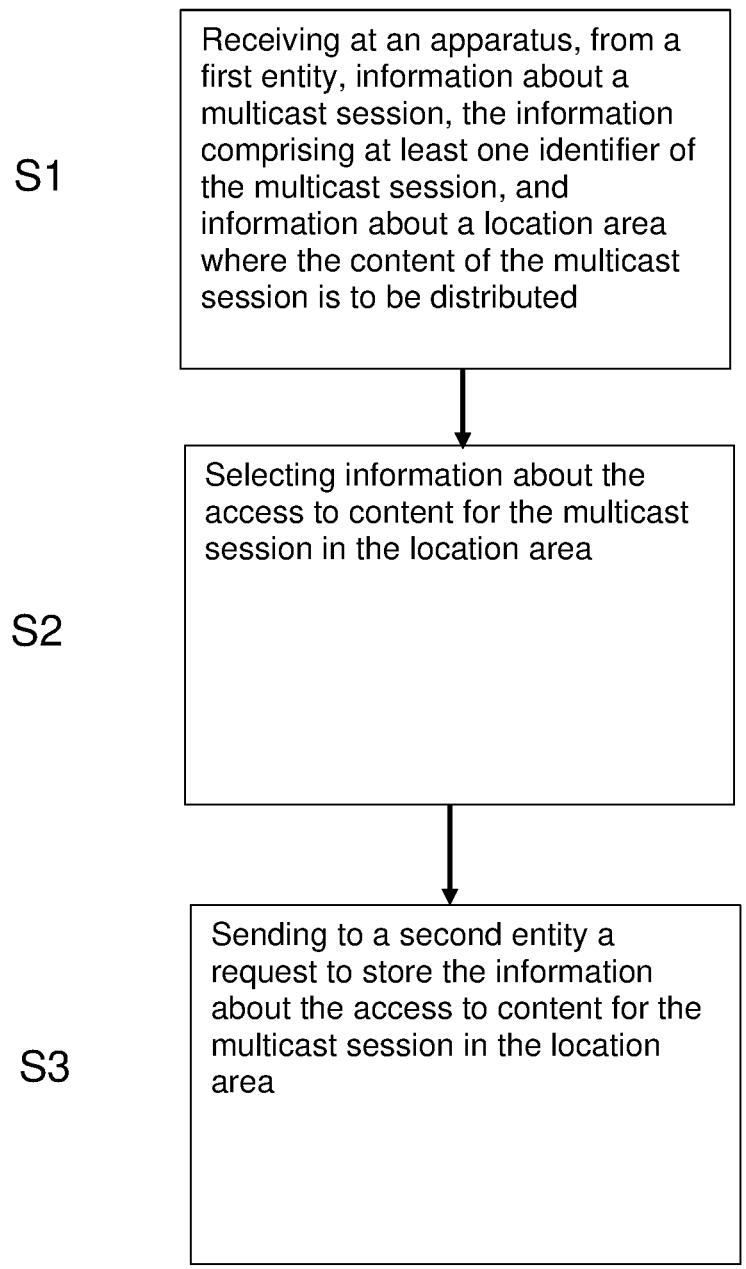
FIG. 8 is a flow chart of a method according to an example.

FIG. 8 is a flow chart of a method according to an example.

At S1 the method comprises receiving at an apparatus, from a first entity, information about a multicast session, the information comprising at least one identifier of the multicast session, and information about a location area where the content of the multicast session is to be distributed.

At S2 the method comprises selecting information about the access to content for the multicast session in the location area.

At S3 the method comprises sending to a second entity a request to store the information about the access to content for the multicast session in the location area.

Figure 9:
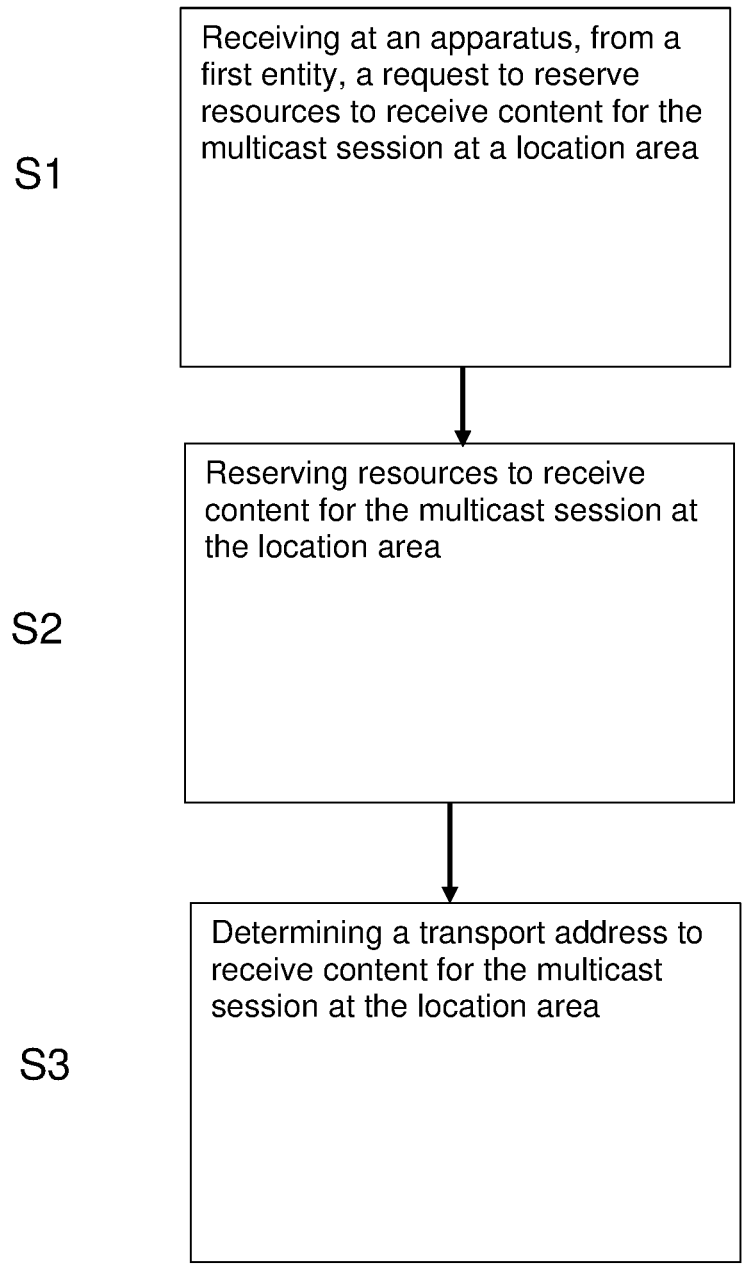
FIG. 9 is a flow chart of a method according to an example.

FIG. 9 is a flow chart of a method according to an example.

At S1 the method comprises receiving at an apparatus, from a first entity, a request to reserve resources to receive content for the multicast session at a location area.

At S2 the method comprises reserving resources to receive content for the multicast session at the location area.

At S3 the method comprises determining a transport address to receive content for the multicast session at the location area.

Figure 10:
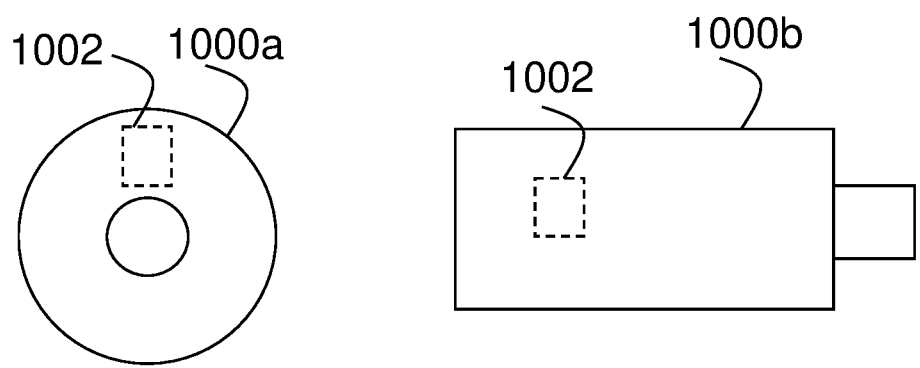
FIG. 10 shows a schematic representation of a non-volatile memory medium storing instructions which when executed by a processor allow a processor to perform one or more of the steps of the methods of some embodiments.

FIG. 10 shows a schematic representation of non-volatile memory media 1000a (e.g. computer disc (CD) or digital versatile disc (DVD)) and 1000b (e.g. universal serial bus (USB) memory stick) storing instructions and/or parameters 1002 which when executed by a processor allow the processor to perform one or more of the steps of the methods of FIGS. 5 to 9.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 6 and 7, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
 (a) hardware-only circuit implementations (such as implementations in only analogue and/or digital circuitry);
 (b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:
 at least one processor; and
 at least one memory including computer program code of a unified data repository (UDR) of a communication network;
 wherein the computer program code is configured to, when executed by the at least one processor, cause the apparatus at least to perform:
  storing information for a multicast session, the information comprising:
   an identifier of the multicast session; and
   information about access to content for the multicast session in respective location areas of a plurality of different location areas, wherein the information about access to different content for the multicast session in a respective location area of the plurality of location areas comprises:
    an identity of a control node of the communication network that is controlling an ingress point of the communication network that provides content for the multicast session in the respective location area; and
    area session identifier that identifies the respective location area; and
  in response to receiving, from a session management function of the communication network, a request for information about access to content for the multicast session in a location area of the plurality of location areas, providing, to the session management function, the information about access to content for the multicast session in the location area.

2. The apparatus according to claim 1, wherein the the computer program code is configured to, when executed by the at least one processor, cause the apparatus to:
 receive, from a network exposure function of the communication network, a request for the UDR to store, for the multicast session, the information about the access to content for the multicast session in at least one location area of the plurality of different location areas in the information for the multicast session.

3. The apparatus according to claim 2, wherein the request comprises the identifier of the multicast session and the area session identifier that identifies the at least one location area.

4. The apparatus according to claim 1, wherein computer program code is configured to, when executed by the at least one processor, cause the apparatus to allocate, for a respective location area of the plurality of different location areas, an area session identifier that identifies the respective location area.

5. The apparatus according to claim 1, wherein the request includes information indicative of a location of a user equipment, and wherein the providing comprises providing information about access to content for the multicast session in a location corresponding to the location of the user equipment.

6. An apparatus comprising:
 at least one processor; and
 at least one memory including computer program code of a session management function of a communication network;
 the computer program code configured to, when executed by the at least one processor, cause the apparatus at least to perform:
  obtaining, from a user equipment (UE), a request to join a multicast session;

obtaining location information indicative of a location of the UE;

sending, to a unified data repository (UDR) of a communication network, a request for information about access to content for the multicast session in a location area corresponding to the location of the UE indicated in the location information; and receiving, from the UDR, the information about access to content for the multicast session in the location area corresponding to the location of the UE, wherein the information about access to content for the multicast session in the location area corresponding to the location of the UE comprises:

an identity of a control node of the communication network that is controlling an ingress point of the communication network that provides content for the multicast session in the location area; and area session identifier that identifies the location area.

7. The apparatus according to claim 6, wherein the obtaining location information indicative of a location of the UE comprises;

sending an enquiry for the location of the UE; and receiving the location information indicative of the location of the UE in response to the enquiry.

8. The apparatus according to claim 6, wherein the request for information about access to content for the multicast session in a location area corresponding to the location of the communication device comprises the location information indicative of the location of the UE.

9. The apparatus according to claim 6, wherein the computer program code is configured to, when executed by the at least one processor, cause the apparatus to perform:

sending information indicating that the UE shall receive content related to a multicast session in the location area, and sending the information about the access to content for the multicast session in the location area to a radio access network (RAN) node of the communication network.

10. The apparatus according to claim 9, wherein the computer program code are configured to, when executed by the at least one processor, cause the apparatus to perform:

receiving from the updated location information, the updated location information comprising an indication that the communication device left the location area and an indication of a new location of the UE; and obtaining information about the access to content for the multicast session in in a location area corresponding to the new location.

11. The apparatus according to claim 9, wherein the computer program code is configured to, when executed by the at least one processor, cause the apparatus to perform:

discovering that the UE left the multicast session; and sending information to the RAN node that the UE left the multicast session.

12. A radio access network (RAN) node of a communication network, the apparatus comprising:

at least one processor; and at least one memory including computer program code;

wherein the computer program code is configured to, when executed by the at least one processor, cause the RAN node at least to perform:

receiving, from a session management function (SMF) of a communication network, information indicating that a user equipment (UE) shall receive content related to a multicast session in a location area, and information about access to content for the multicast session in the location area, wherein the information about access to content for the multicast session in the location area comprises an identity of a control node of the communication network that is controlling an ingress point of the communication network that provides content for the multicast session in the location area, and area session identifier that identifies the location area;

determining whether reception of content for the multicast session in the location area is already configured at the RAN node; and based on determining that the reception of content for the multicast session is not yet configured at the RAN node, configuring the RAN node for the reception of content for the multicast session in the location area using the information about access to content for the multicast session in the location area.

13. The RAN node according to claim 12, wherein the computer program code is configured to, when executed by the at least one processor, cause the RAN node to perform, when the apparatus detects that the UE has left the location area, sending to the SMF, at least one of an indication that the UE has left the location area or information indicative of a new location of the UE.

14. The RAN node according to claim 12, wherein the computer program code is configured to, when executed by the at least one processor, cause the RAN node to perform:

receiving signalling indicating that the UE left the multicast session; and determining whether one or more other UEs served by the RAN node participate in the multicast session in the location area; and based on determining that no other UEs served by the RAN node participate in the multicast session in the location area, configuring, at the RAN node, termination of the reception of content for the multicast session in the location area.

15. The RAN node according to claim 12, wherein the computer program code is configured to, when executed by the at least one processor, cause the apparatus-RAN node to perform:

hand over of the UE to a second RAN node;

providing an indication to the second RAN node that the UE participates in the multicast session and the information about access to content for the multicast session in the location area;

determining whether one or more other UEs served by the RAN node participate in the multicast session in the location area; and based on determining that no other UEs served by the RAN node participate in the multicast session in the location area, configuring, at the RAN node, termination of the reception of content for the multicast session in the location area.

16. The RAN node according to claim 12, wherein the computer program code is configured to, when executed by the at least one processor, cause the RAN node to perform:

receiving information of a hand over of a second UE, information that the second UE participates in the multicast session, and information about access to content for the multicast session which the second UE is participating in in a second location area;

determining whether the second UE has left the second location area;

determining whether the reception of content for the multicast session which the second UE is participating in is already configured at the RAN node;

based on determining that the second UE did not leave said second location area, and that the reception of content for the multicast session in said second location area is not yet configured at the RAN node, configuring the reception of content for the multicast session in said second location area at the RAN node; and based on determining that the second UE has left said second location area, sending, to the SMF, at least one of an indication that the second UE has left said second location area or information indicative of a new location of the second UE.

17. The RAN node according to claim 12, the computer program code is configured to, when executed by the at least one processor, cause the RAN node to perform, when configuring the reception of content for the multicast session in the location area, sending a request to the control node, wherein the request includes at least one of the location area or the area session identifier.

18. The RAN node according to claim 12, wherein the computer program code are configured to, when executed by the at least one processor, cause the RAN node to perform, when configuring termination of the reception of content for the multicast session in the location area, sending a request for the termination of the reception of content for the multicast session to the control node, the request for termination comprising least one of the area session identifier or information indicative of the location area.

* * * * *